US008531969B2

(12) United States Patent
Ong

(10) Patent No.: US 8,531,969 B2
(45) Date of Patent: Sep. 10, 2013

(54) PATH COMPUTATION SYSTEMS AND METHODS FOR HETEROGENEOUS MULTI-DOMAIN NETWORKS

(75) Inventor: Lyndon Y. Ong, Sunnyvale, CA (US)

(73) Assignee: Ciena Corporation, Hanover, MD (US)

(*) Notice: Subject to any disclaimer, the term of this patent is extended or adjusted under 35 U.S.C. 154(b) by 317 days.

(21) Appl. No.: 13/011,547

(22) Filed: Jan. 21, 2011

(65) Prior Publication Data
US 2012/0188906 A1    Jul. 26, 2012

(51) Int. Cl.
*H04L 12/56* (2011.01)
*H04J 1/16* (2006.01)

(52) U.S. Cl.
USPC ........... 370/238; 370/252; 370/254; 370/389; 370/401

(58) Field of Classification Search
USPC .......................... 370/252, 254, 389, 401, 238
See application file for complete search history.

(56) References Cited

U.S. PATENT DOCUMENTS
8,320,255 B2 * 11/2012 Vasseur et al. ................ 370/238
2010/0208584 A1 * 8/2010 Sone et al. .................... 370/228

OTHER PUBLICATIONS

Silvana Greco Polito, Mohit Chamania and Admela Jukan; "Extending the Inter-domain PCE Framework for Authentication and Authorization in GMPLS Networks"; IEEE Communications Society (c)2009 IEEE.
Jordi Perello, Guillem Hernandez-Sola, Fernanco Agraz, Salvatore Spadaro, and Jaume Comellas; ETRI Journal, vol. 32, No. 4, Aug. 2010.

* cited by examiner

*Primary Examiner* — John Pezzlo
(74) *Attorney, Agent, or Firm* — Clements Bernard PLLC; Christopher L. Bernard; Lawrence A. Baratta, Jr.

(57) ABSTRACT

The present disclosure provides path computation systems and methods operating over heterogeneous multi-domain networks. Specifically, path computation systems and methods utilize PCE mechanisms with additional functionality enabling heterogeneous domain characteristics. In an exemplary embodiment, a network includes a plurality of domains with each domain having a PCE implemented either as a separate server-based application or resident application in a network node. Different methods may be utilized for determining what PCE to access for information. Instead of a list of nodes and links given in a common format, each PCE can compute a path within its domain using a node and link address/identification format of its own, without having to ensure that it can be interpreted by nodes in other domains. This path segment can be further distinguished by a path identifier that verifies that it is created for a particular domain, and avoiding misinterpretation.

18 Claims, 10 Drawing Sheets

PATH COMPUTATION SYSTEMS AND METHODS FOR HETEROGENEOUS MULTI-DOMAIN NETWORKS

FIELD OF THE INVENTION

The present invention relates generally to communication networks. More particularly, the present invention relates to path computation systems and methods operating over heterogeneous multi-domain networks including networks using Multiprotocol Label Switching (MPLS), Generalized MPLS (GMPLS), Automatic Switched Transport Network (ASTN), Automatically Switched Optical Network (ASON), Optical Signal and Routing Protocol (OSRP), and the like.

BACKGROUND OF THE INVENTION

Networks may be divided into multiple domains for reasons of scalability or administrative policy. In general, computation of paths crossing multiple domains is done using some method of topology abstraction in order to improve the scalability of the routing protocol or to maintain some privacy of the topology within individual domains. More recently, another method has been proposed using a separate Path Computation Element (PCE) for each domain and in some cases a PCE at a higher level that has a view of multiple domains and can contact their PCEs. Each PCE computes a path in its own domain and exports the path so that a complete path can be defined across multiple domains, without loss of accuracy. This path is used as the Explicit Route Object (ERO) in connection setup. For the PCE methods, accurate paths can be computed using the help of multiple PCEs where each PCE keeps the topology within its domain confidential. However, such methods at the current time are designed for domains with essentially homogeneous characteristics such as addressing scheme, node identification, and internal protocol. This is because the Explicit Route Object is designed to hold route hops that are part of a consistent addressing or identifier scheme in order to detect if loops have occurred in the computed path. In addition, there is some potential for the returned ERO to be no longer valid at the time the connection is requested, since there is a delay involved during which the resources along the returned ERO have been allocated to other connections, leading to a requirement to crankback or recomputed the path.

BRIEF SUMMARY OF THE INVENTION

In an exemplary embodiment, a path computation method across a multi-domain network includes requesting a path setup from a node A in a domain A to a node Z in a domain Z; receiving an Explicit Route Object including a path from the node A to the node Z, wherein the Explicit Route Object includes an unparsed domain-specific path segment for domain Z or any intermediate domains between the domain A and the domain Z, and wherein the unparsed domain-specific path segment is not understood by the domain A; and using the Explicit Route Object to set up a path from the node A to the node Z. The unparsed domain-specific path segment is treated as a single, non-parsed object in the domain A. The unparsed domain-specific path segment is utilized because the domain A uses a different addressing scheme and is not configured to parse the unparsed domain-specific path. The requesting and receiving steps may be performed by a Path Computation Element (PCE) in the domain A. The unparsed domain-specific path segment may be determined by a PCE in the domain Z or any intermediate domains. The PCE in the domain Z or any intermediate domains is configured to parse the unparsed domain-specific path segment during path setup. The path computation method may further include, with each PCE in each domain, temporarily reserving resources on a computed path segment in the Explicit Route Object; using the reserved resources in path setup; and if no setup message received for a predetermined time, releasing the temporarily reserved resources.

In another exemplary embodiment, a multi-domain network includes two or more domains; a plurality of nodes in each of the two or more domains; a first addressing scheme for the plurality of nodes in a first domain of the two or more domains; a second addressing scheme for the plurality of nodes in a second domain of the two or more domains; wherein a first node in the first domain is configured to receive an Explicit Route Object comprising a path from the first node to a second node in the second domain, wherein the Explicit Route Object comprises an unparsed domain-specific path segment for the second domain. The unparsed domain-specific path segment is treated as a single, non-parsed object in the first domain. The multi-domain network may further include a first Path Computation Element (PCE) in the first domain; and a second PCE in the second domain. The unparsed domain-specific path segment is determined by the second PCE. The second PCE is configured to parse the unparsed domain-specific path segment during path setup. The second PCE may be configured to temporarily reserve resources on a computed path segment in the second domain in the Explicit Route Object; use the reserved resources in path setup; and if no setup message received for a predetermined time, release the temporarily reserved resources.

In yet another exemplary embodiment, a Path Computation Element (PCE) includes an interface communicatively coupling the PCE to a plurality of nodes forming a first domain; algorithms for path computation and setup; a processor communicatively coupled to the interface and configured to execute the algorithms for path computation and setup; and an algorithm to set up a path over heterogeneous domains outside the first domain. The algorithm to set up a path over heterogeneous domains outside the first domain includes requesting a path setup from a first node in the first domain to a second node in an external domain; receiving an Explicit Route Object including a path from the first node to the second node, wherein the Explicit Route Object includes an unparsed domain-specific path segment for the external domain or any intermediate domains between the first domain and the external domain, and wherein the unparsed domain-specific path segment is not understood by the PCE; and using the Explicit Route Object to set up a path from the first node to the second node. The unparsed domain-specific path segment may be treated as a single, non-parsed object in the first domain by the PCE. The unparsed domain-specific path segment may be determined by a second PCE in the external domain or any intermediate domains. The second PCE is configured to parse the unparsed domain-specific path segment during path setup. The second PCE may be configured to temporarily reserve resources on a computed path segment in the Explicit Route Object; use the reserved resources in path setup; and if no setup message received for a predetermined time, release the temporarily reserved resources.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
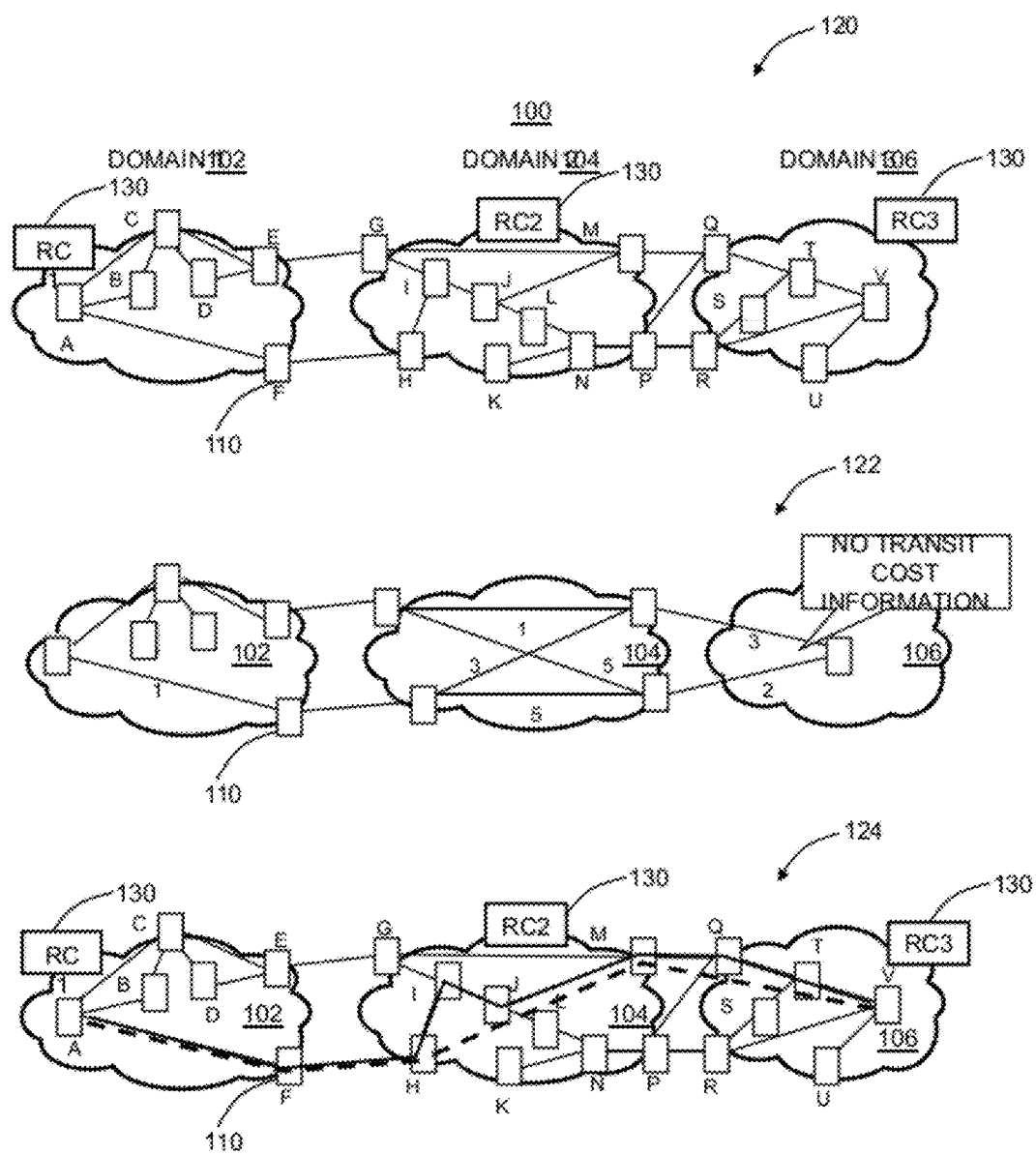
FIG. 1 illustrates network diagrams of a multi-domain network using External Network to Network Interface (E-NNI) interfaces between the domains.

In various exemplary embodiments, the present invention provides path computation systems and methods operating over heterogeneous multi-domain networks including networks using MPLS, GMPLS, ASTN, ASON, OSRP, and the like. Specifically, the present invention utilizes PCE mechanisms with additional functionality enabling heterogeneous domain characteristics. In an exemplary embodiment, a network includes a plurality of domains with each domain having a PCE implemented either as a separate server-based application or resident application in a network node. Different methods may be utilized for determining what PCE to access for information. Instead of a list of nodes and links given in a common format (IPv4 format in a typical implementation), each PCE can compute a path within its domain using a node and link address/identification format of its own, without having to ensure that it can be interpreted by nodes in other domains. This path segment can be further distinguished by a path identifier that verifies that it is created for a particular domain, and avoiding misinterpretation.

In addition, the PCE originating a path segment can make a reservation of capacity along the path that it has exported in order to reduce the potential for the path segment to be unavailable when the connection request is made, which reduces the potential for crankback and the associated increased latency of setup. The path identifier in the path segment in the ERO can be used to associate the setup request with the reserved capacity. This method of path computation allows network domains with heterogeneous control plane protocols, node addressing and identification characteristics to participate in a PCE environment with other domains and support precise, scalable path computation across multiple domains. Further it increases the privacy and independence of topology information within each domain, as the path segment received from another domain is not guaranteed to be in a format that can be interpreted outside of the domain.

This invention also allows domains using the same protocol to use overlapping address spaces such that a node in one domain may have the same address or identifier value as a node in another domain (so long as the border nodes are identifiable using a common address space). The temporary reservation mechanism proposed reduces the probability of connections being blocked due to the delay between the path computation and its associated connection request, without permanently stranding resources.

Referring to FIGS. 1-4, 6, and 8, in various exemplary embodiments, a multi-domain network 100 is illustrated with three domains 102, 104, 106 and a plurality of interconnected nodes 110. In the various exemplary embodiments described herein, the multi-domain network 100 is utilized as an example network for illustration purposes with the three domains 102, 104, 106 and the plurality of interconnected nodes 110 in each of the domains 102, 104, 106. The nodes 110 may include optical network elements, switches, routers, cross-connects, etc. that utilize MPLS, GMPLS, ASTN, ASON, OSRP, etc. Also, the multi-domain network 100 may include any of IP/MPLS, MPLS Transport Profile (MPLS-TP), Connection-oriented Ethernet, Synchronous Optical Network (SONET), Synchronous Digital Hierarchy (SDH), Optical Transport Network (OTN) and photonic or wavelength switched optical networks. For clarification, the nodes 110 include labels A, B, C, etc. Furthermore, the various domains 102, 104, 106 may be heterogeneous meaning each domain 102, 104, 106 may utilize different protocols, formats, identifiers, addressing, etc. for path computation. Those of ordinary skill in the art will appreciate the multi-domain network 100 is presented for illustration purposes and practical embodiments may include any number of domains, nodes 110, and the like.

Referring to FIG. 1, in an exemplary embodiment, the multi-domain network 100 is illustrated using External Network to Network Interface (E-NNI) interfaces between the domains 102, 104, 106. In particular, FIG. 1 includes three diagrams 120, 122, 124 of the multi-domain network 100 with the diagram 120 illustrating the physical topology of the multi-domain network 100, the diagram 122 illustrating an abstraction of the domains 102, 104, 106 through advertisements, and the diagram 124 illustrating an exemplary path computation. In the physical topology, each of the domains 102, 104, 106 include a routing controller (RC1, RC2, RC3) 130 at one of the nodes 110 in the domain. The routing controllers 130 are configured to advertise topology for their respective domains 102, 104, 106, and each domain 102, 104, 106 may use a different protocol and address/namespace, i.e. heterogeneous domains.

In the diagram 122, the routing controller 130 RC2 in the domain 104 advertises that the domain's 104 topology as four links connecting the nodes 110 G, H, M and P with associated costs listed on each link. The routing controller 130 RC3 advertises that the domain's 106 topology is a single node 110 V with links to nodes 110 M and P in the domain 104. Thus in the diagram 122, abstraction reduces the number of links advertised in routing from 27 links to 13, for scalability. The diagram 124 illustrates an end-to-end path computation from a source node 110 A in the domain 102 to a destination node 110 V in the domain 106. The source node 110 A computes an end-to-end path using what appears to be the least cost path to the destination node 110 V, however the actual physical path and costs will differ due to the use of topology abstraction.

Figure 2:
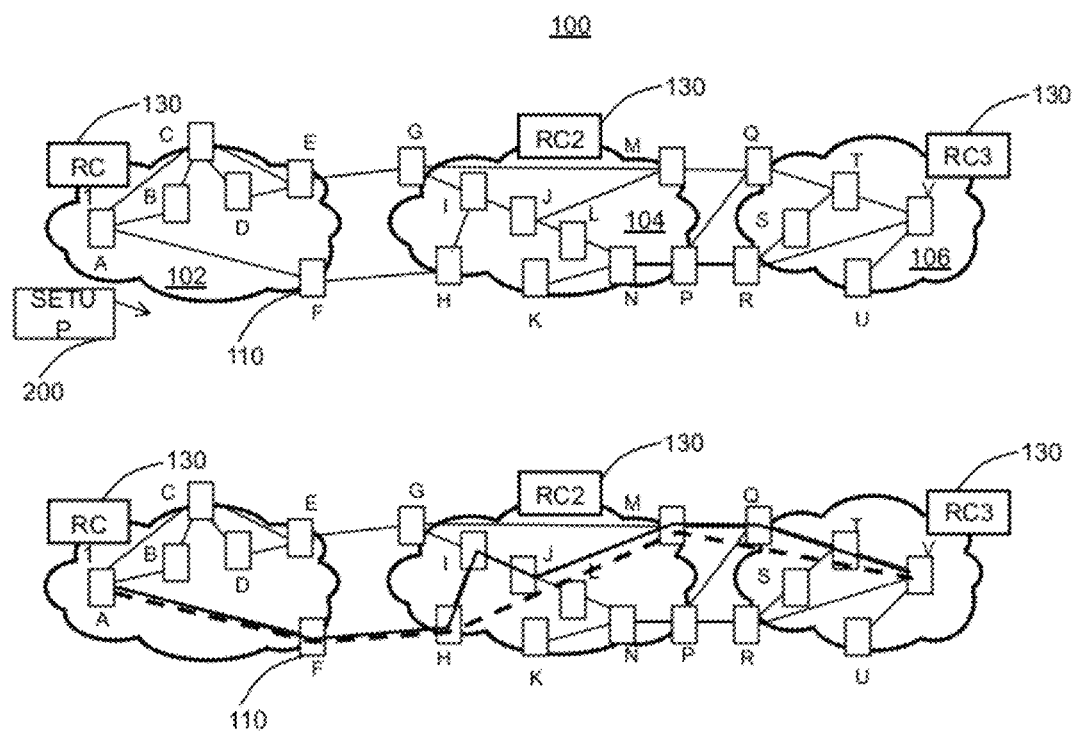
FIG. 2 illustrates network diagrams of the multi-domain network of FIG. 1 showing a signaling process for connection setup between the domains.

Referring to FIG. 2, in an exemplary embodiment, the multi-domain network 100 is illustrated showing a signaling process for connection setup between the domains 102, 104, 106. For example, to setup a path, the node 110 A sends a setup message 200 containing an ERO with a full path (A, F, H, M, V) through each of the domains 102, 104, 106. As the setup message 200 reaches the node 110 H in the domain 104, a detailed path is computed through the domain 104, such as by the routing controller 130 RC2 and the ERO in the setup message 200 is changed to this detailed path, e.g. (A, F, H, I, J, M, Q, V). As the setup message 200 reaches the node 110 Q in the domain 106, a detailed path is computed through the domain 106, such as by the routing controller 130 RC3 and the ERO in the setup message 200 is changed to this detailed path, e.g. (A, F, H, I, J, M, Q, T, V).

Figure 3:
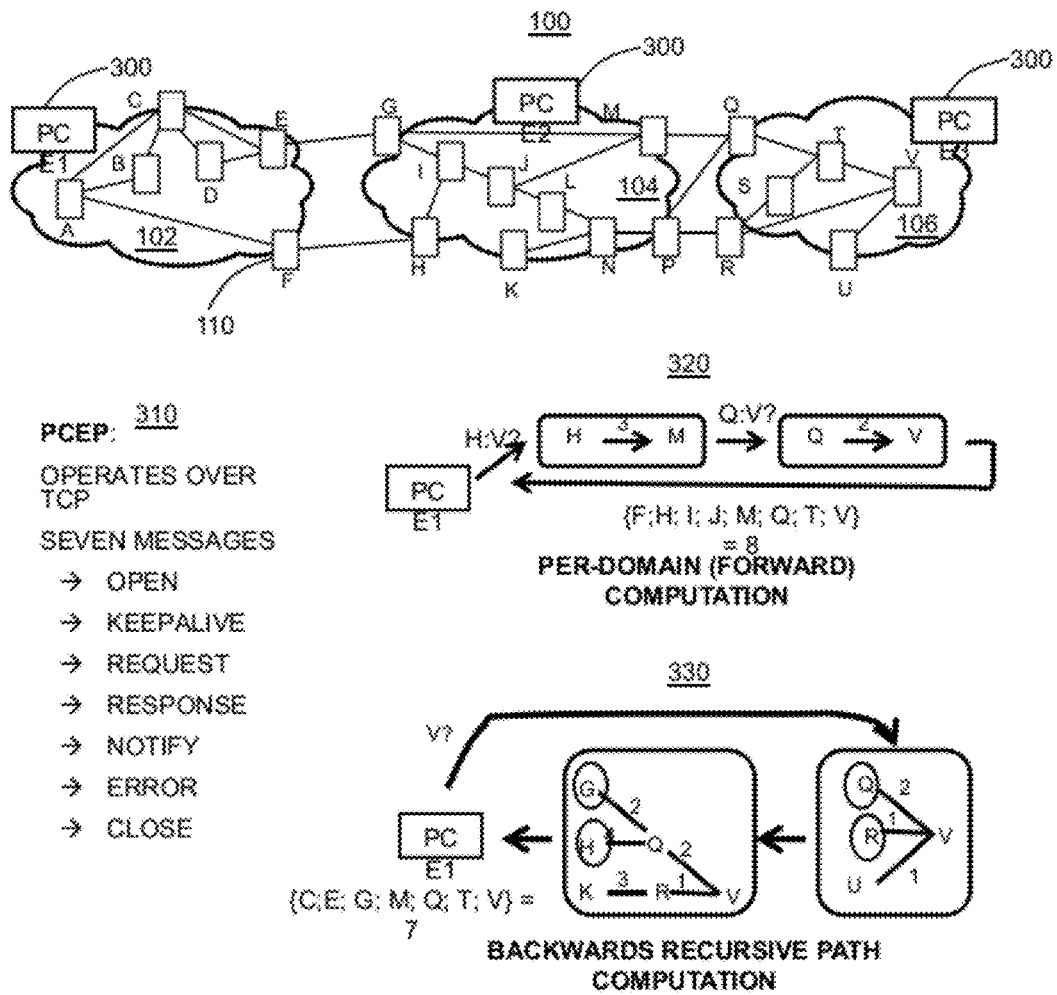
FIG. 3 illustrates network diagrams of the multi-domain network using Path Computation Elements (PCEs) between the domains.

Referring to FIG. 3, in an exemplary embodiment, the multi-domain network 100 is illustrated using Path Computation Elements (PCEs) 300 between the domains 102, 104, 106. Here, the multi-domain network 100 includes PCEs 300 in each of the domains 102, 104, 106. The PCEs 300 may be defined by the Internet Engineering Task Force (IETF) in RFC 4655, "A Path Computation Element (PCE)-Based Architecture", as entities (component, application, or network node) that are capable of computing a network path or route based on a network graph and applying computational constraints. In FIG. 3, each of the domains has the PCE (PCE1, PCE2, PCE3) 300 that supplies a path across the domain on request. Note, the nodes 110 in the domain 102 do not know the topology of the domains 104, 106, but can still request path information to compute an end-to-end path from the node 110 A to the node 110 V.

In Per-Domain PCE, the node 110 A requests a path from the PCE1 300, which passes this on to the PCE2 and PCE3 300. That is, each of the PCEs 300 computes the path in its respective domain and returns the total path to the node 110 A as a single ERO. The ERO is then used in the setup message from the node 110 A to set up the connection. The PCE may include PCE Protocol (PCEP) messages 310 operating over Transmission Control Protocol (TCP) such as OPEN, KEEPALIVE, REQUEST, RESPONSE, NOTIFY, ERROR, and CLOSE. PCE is defined in various RFC's from the IETF such as, for example, RFC 4657 "Path Computation Element (PCE) Communication Protocol Generic Requirements," RFC 4674 "Requirements for Path Computation Element (PCE) Discovery," RFC 4927 "Path Computation Element Communication Protocol (PCECP) Specific Requirements for Inter-Area MPLS and GMPLS Traffic Engineering," RFC 5376 "Inter-AS Requirements for the Path Computation Element Communication Protocol (PCECP)," RFC 5394 "Policy-Enabled Path Computation Framework," RFC 5440 "Path Computation Element (PCE) Communication Protocol (PCEP)," and the like.

For interaction between the PCEs 300, there are multiple methods 320, 330 exist for PCE-to-PCE interaction. For example, a forward/per-domain method 320 may calculate a route in each domain progressing forward and at the end send the path back to the initiating node 110 A. For example, the PCE1 300 may compute a path first through the domain 102 from the node 110 A to a first node 110 H in the next domain 104. The PGE2 300 may then compute a path through the domain 104 from the node 110 H to a last node 110 M in the domain 104 and a first node 110 Q in the third domain 106. The PCE3 300 may then compute a path through the domain 106 from the node 110 Q to the destination node 110 V forwarding the ERO back at this point to the node 110 A and the PCE1 300. For example, the ERO may include {F; H; I; J; M; Q; T; V}=8. A backwards recursive computation method 330 may start with the destination node 110 V in the domain 106 and work backwards to form the route in a recursive manner. For example, the PCE1 300 may send a request to the PCE3 300 where the destination node 110 V resides. Here, the backwards recursive computation method 330 may compute a route backwards through the domains 106, 104, 102. For example, the ERO may include {C; E; G; M; Q; T; V}=7.

Figure 4:
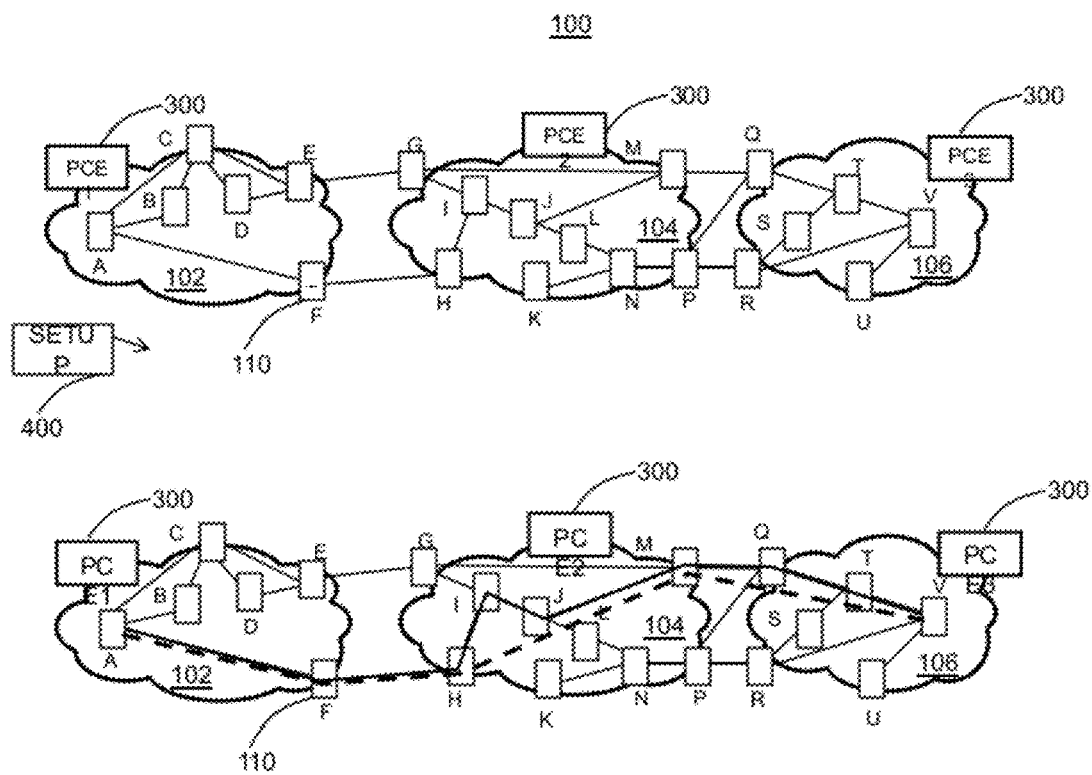
FIG. 4 illustrates network diagrams of the multi-domain network of FIG. 3 showing another signaling process for connection setup between the domains.

Referring to FIG. 4, in an exemplary embodiment, the multi-domain network 100 is illustrated showing another signaling process for connection setup between the domains 102, 104, 106. To setup a path with the PCEs 300, the node 110 A sends a setup message 400 containing an ERO with the full and detailed path supplied by the PCEs, such as, for example, (A, F, H, I, J, M, Q, T, V). This path may be derived from the forward/per-domain method 320, the backwards recursive computation method 330, etc. At the ingress of the domain 104, the ingress border node 110 H has a detailed path through the domain 104 and can follow this without further path computation. At the ingress of the domain 106, the ingress border node 110 Q similarly has a detailed path through the domain 106 to the destination node 110 V and does no further path computation.

With respect to computing paths between the domains 102, 104, 106, there may be problems in that particular domain 102, 104, 106 may use different methods of identifying nodes and links, particular domain 102, 104, 106 may use the same method of identification but a different numbering space, or a path that has been computed by the PCE 300 may be invalidated. For example, the different methods may include standards based on Internet Protocol (IP)/GMPLS, non-IP-based control plane methods with addresses that are not IP-based and not understood by an IP node, and the like. The domains 102, 104, 106 may use the same methods of identification but may have a different number space such as IP-based using private IP space, addresses with may not be parseable by a neighbor domain using public IP space, or addresses that overlap with addresses in the other domains. Further, after the ERO has been sent to the source node 110, new requests may already use resources on the path, making it unavailable for the connection.

The PathKey mechanism (e.g., RFC 5553, "Resource Reservation Protocol (RSVP) Extensions for Path Key Support") has been proposed to ensure security of internal domain topology information. Here, the PCE2 300 generates an encryptable key rather than an ERO segment and the PCE2 300 returns the Pathkey to the source node 110 A rather than an ERO segment. The setup request message ERO contains the key and PCE 300 ID, e.g. (A, F, H, Key, V). The ingress border node 110 H in the domain 104 sends the key to the PGE2 300 which returns the detailed path segment (I, J, M, Q). However, this adds a requirement on the domain, means signaling procedure requires PCE request/response, and adds latency and complication.

Figure 5:
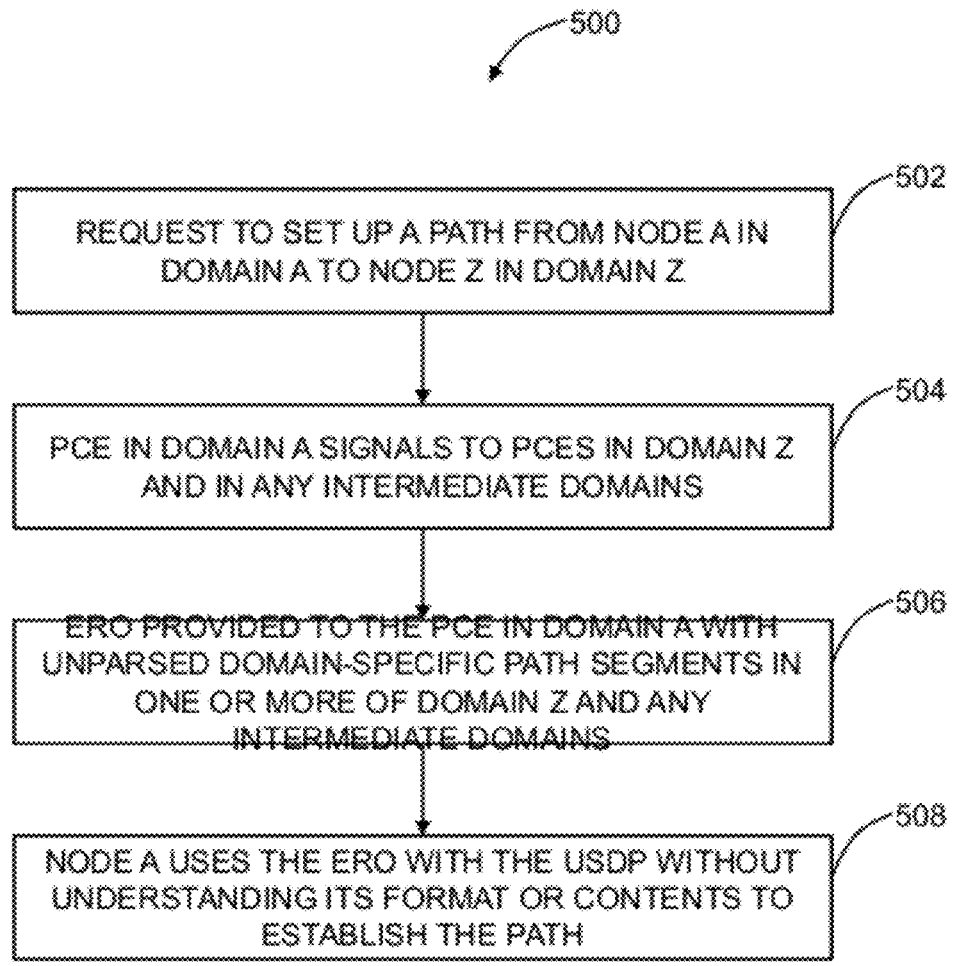
FIG. 5 illustrates a flowchart of a multi-domain path connection method utilizing unparsed domain-specific path segments in Explicit Route Objects (EROs)

Referring to FIG. 5, in an exemplary embodiment, a flowchart illustrates a multi-domain path connection method 500 utilizing unparsed domain-specific path segments in EROS. Specifically, the multi-domain path connection method 500 enables a path computation across a plurality of heterogeneous domains without requiring each domain to understand particularities of the other domains. Further, the multi-domain path connection method 500 may be applied to different path computation techniques such as E-NNI, PCE, etc. For illustration purposes, the multi-domain path connection method 500 is described herein with respect to PCE.

The multi-domain path connection method 500 begins with a request, such as a request to set up a path from node A in domain A to node Z in domain Z (step 502). For example, assume the multi-domain path connection method 500 is implemented in a network with a plurality of domains A . . . Z with possibly intermediate domains between A and Z and with a plurality of nodes in each domain. The PCE in domain A signals to PCEs in domain Z and in any intermediate domains (step 504). Here, the PCEs may use any method to determine/compute a path from nodes A to Z. An ERO is provided to the PCE in domain A with unparsed domain-specific path segments in one or more of Domain Z and any intermediate domains (step 506). Here, the present invention proposes to add unparsed domain-specific path segment (UDSP) to the ERO. The UDSP is a path segment through a particular domain that is parseable by that particular domain, but may not be parseable by another domain (i.e. since the domains are heterogeneous). The node A uses the ERO with the UDSP without understanding its format or contents to establish the path (step 508). The UDSP is domain-specific in format and encoding and it may use a different addressing space. The source node A is able to use this UDSP in its ERO without understanding its format or contents since the source node is sending out the ERO, and the particular domain that receives the ERO will be able to parse the UDSP even though the source node A cannot.

Using the multi-domain path connection method 500 enables the various domains in the network to use any numbering/addressing procedure including not having to follow standard protocols. This maintains privacy and independence within the domain, maintains loop-avoidance outside the domain, avoids need for PCE request/response cycle during connection setup, and avoids need for PCE reachability from the domain ingress node.

Figure 6:
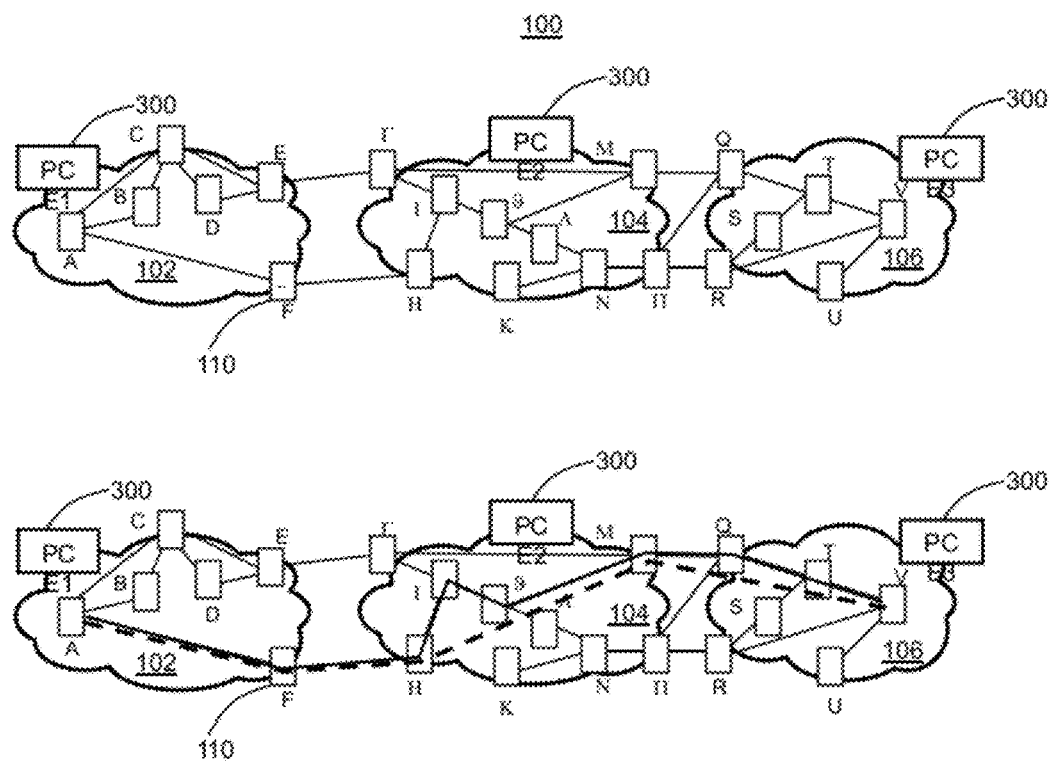
FIG. 6 illustrates network diagrams of the using Path Computation Elements (PCEs) between the domains and the multi-domain path connection method of FIG. 5.

Referring to FIG. 6, in an exemplary embodiment, the multi-domain network 100 is illustrated using Path Computation Elements (PCEs) 300 between the domains 102, 104, 106 and the multi-domain path connection method 500. In this exemplary embodiment, the domains 102, 106 utilize a first number/addressing scheme denoted by the nodes 110 labeled as A, B, C, D, E, F in the domain 102 and as Q, R, S, T, U, V in the domain 106. The nodes 110 in the domain 104 utilize a different scheme from the domains 102, 104, e.g. the nodes 110 in the domain 104 are labeled as F, H, I, θ, K, A, M, N, H rather than G, H, I, J, K, L, M, N, P.

In an exemplary embodiment using the multi-domain path connection method 500, the node 110 A wants a path to the node 110 V. The node 110 A requests a path from the PCE1 300. The PCE1 300 passes the request on to the PCE2 300 and the PCE3 300. As described above, the domain 104 may use a non-IP address scheme. Thus, the PCE2 300 returns a UDSP segment to PCE1 300 rather than a normal ERO segment. This UDSP is treated as a single, non-parsed object to be included in the ERO, e.g. (A, F, H, UDSP2), V). It is assumed that the node 110 H has an address that is understandable to the domain 102 since it is the point of interconnection to the domain 104. When a setup request with the ERO reaches the node 110 H, it is able to parse and understand the UDSP since the UDSP is consistent with internal addressing and naming of the domain 104. The node 110 H can expand the ERO to be (A, F, H, I, J, M, Q, V).

Figure 7:
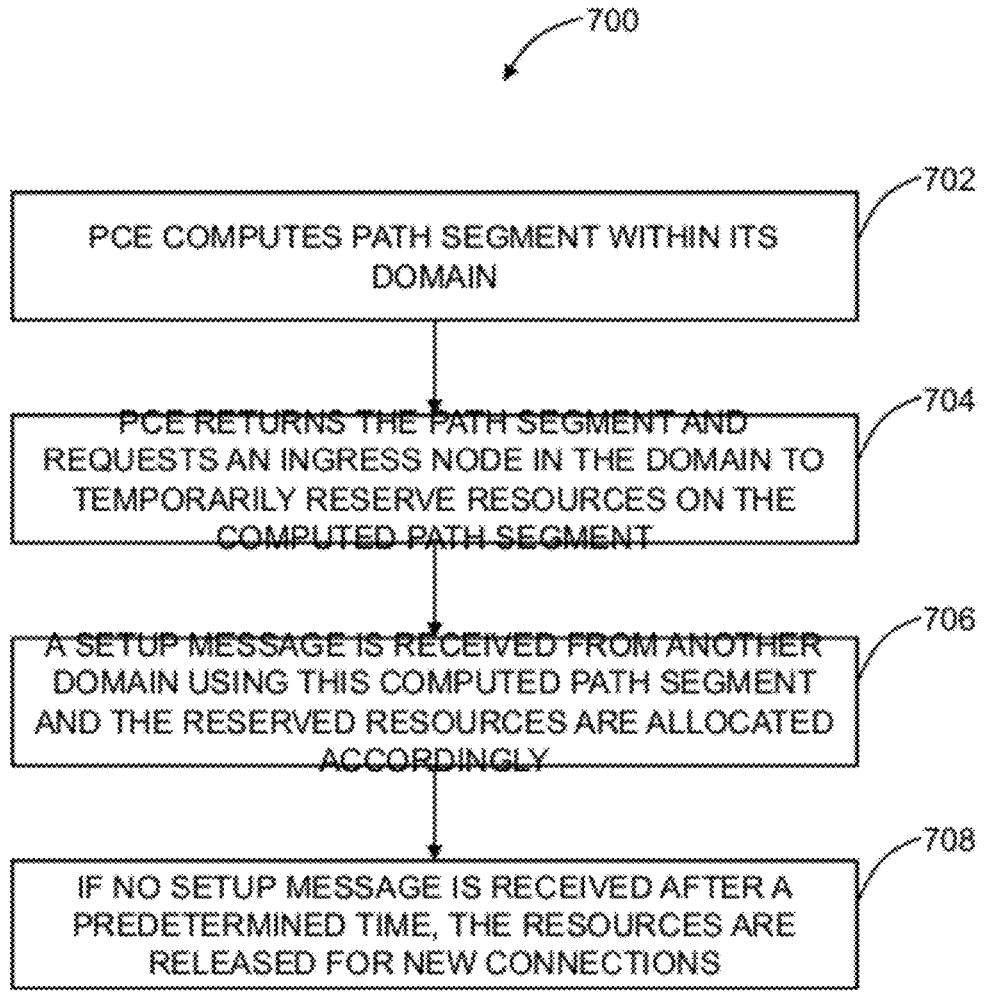
FIG. 7 illustrates a flowchart of a temporary path resource reservation method that may temporarily reserve paths through a domain.

Referring to FIG. 7, in an exemplary embodiment, a flowchart illustrates a temporary path resource reservation method 700 that may temporarily reserve paths through a domain. For example, the temporary path resource reservation method 700 may be used in conjunction with the multi-domain path connection method 500 to remove the potential that a setup message is blocked due to lack of resources in a computed path and to reduce potential setup delay due to crankback or path recomputation. A PCE computes a path segment within its domain (step 702). This may be part of the multi-domain path connection method 500. The PCE returns the path segment and requests an ingress node in the domain to temporarily reserve resources on the computed path segment (step 704). A setup message is received from another domain using this computed path segment and the reserved resources are allocated accordingly (step 706). If no setup message is received after a predetermined time, the resources are released for new connections (step 708).

Figure 8:
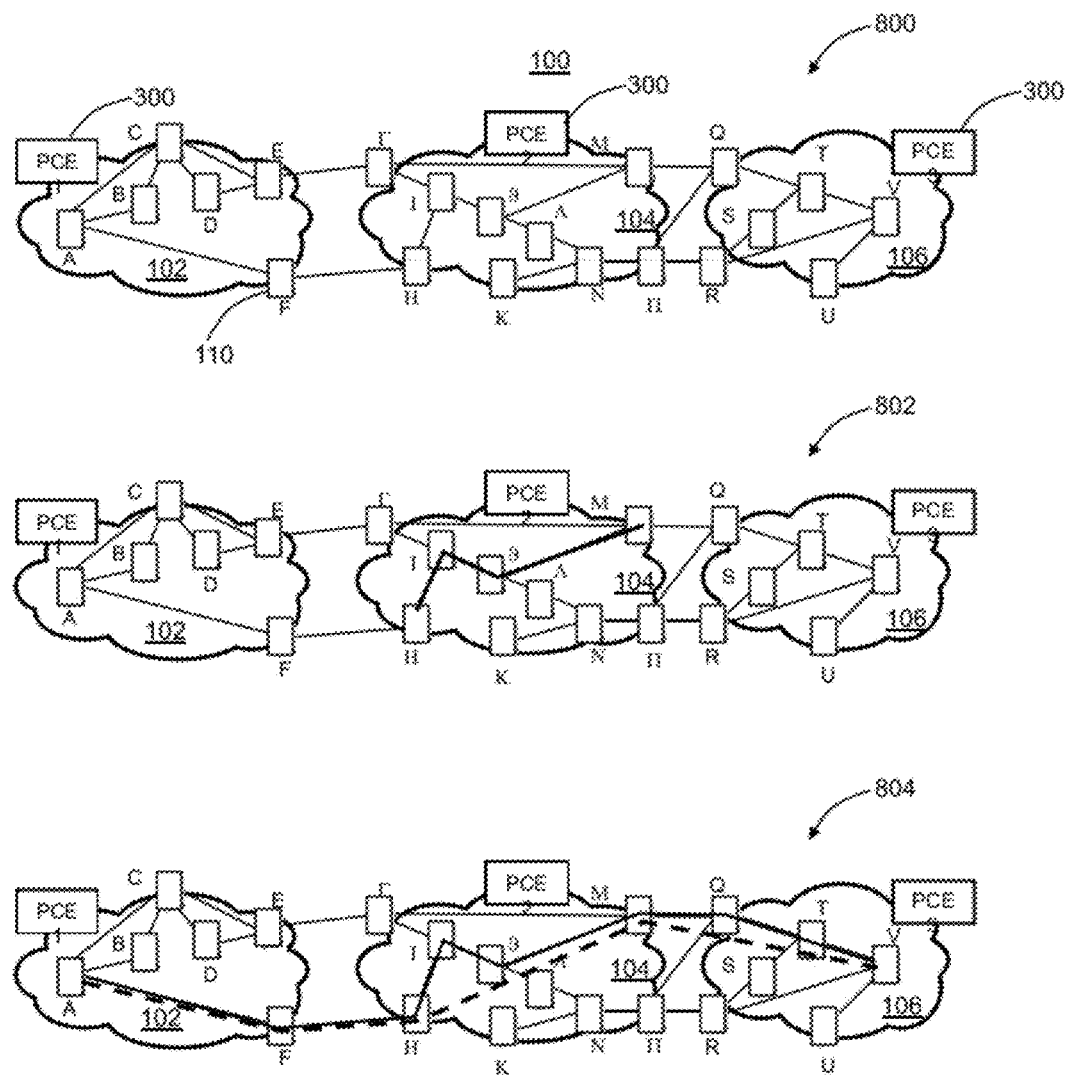
FIG. 8 illustrates network diagrams of the multi-domain network using Path Computation Elements (PCEs) between the domains and the multi-domain path connection method of FIG. 5 and the temporary path resource reservation method of FIG. 7.

Referring to FIG. 8, in an exemplary embodiment, the multi-domain network 100 is illustrated using Path Computation Elements (PCEs) 300 between the domains 102, 104, 106 and the multi-domain path connection method 500 and the temporary path resource reservation method 700. FIG. 8 illustrates the multi-domain network 100 in four steps 800, 802, 804. First, at step 800, the node 110 A in the domain 102 requests a path to the node 110 V in the domain 106. This is accomplished by sending the request to the PGE1 300 which in turn sends the request to the PCE2 300 and the PCE3 300. The PCE2 300 computes path (H, I, θ, K, M) in response to request as shown in the step 802. In addition to returning this path, the PCE2 300 also sends a request to the ingress node 110 H of the path to temporarily reserve resources. The PCE2 300 includes a path identifier in the UDSP. The node 110 H temporarily reserves resources by signaling along the path, and sets a timer T. When the node 110 H receives a setup request from the node 110 F with the path identifier, the node 110 H associates this with the reserved resources and allocates them to the connection. If no setup request is received within time T, the node 110 H releases the resources so that they can be used for other purposes.

The PCE 300 may generally be a centralized server that is communicatively coupled to the nodes 110 in the respective domain 102, 104, 106. Also, the PCE 300 may be implemented as part of a border node 110 in each of the respective domains 102, 104, 106. Further, in an exemplary embodiment, the PCE 300 originating the unparsed domain-specific path segment may be different from the PCE 300 that parses the domain-specific path segment during path setup. For example, it can be a domain node, i.e. there is no requirement to go back to exactly the same PCE 300 that originated the unparsed domain-specific path for this method to work providing flexibility and efficiency. This is significant, since other methods like the PathKey require going back specifically to the PCE 300 that created the PathKey to start with, which is much less flexible and adds overhead. In the present invention, the unparsed domain-specific path segment can be parsed by any of the nodes 110 in the respective domain 102, 104, 106, i.e. no requirement to go back to that respective domain's PCE 300 for parsing.

In an exemplary embodiment, the unparsed domain-specific path segment may be encrypted with a shared key. For example, an unparsed domain-specific path segment from the domain 106 may not be understood by the domain 102, but via the shared key may be decrypted by any of the receiving nodes 110 in the domain 106. In other words, the entity or the PCE 300 that creates the unparsed domain-specific path segment shares a common key with other nodes in the domain so that when it encrypts the unparsed domain-specific path segment, the unparsed domain-specific path segment is not readable outside of the domain, but when it reaches a node in the domain as part of the ERO that node can then decrypt it with the shared key.

Figure 9:
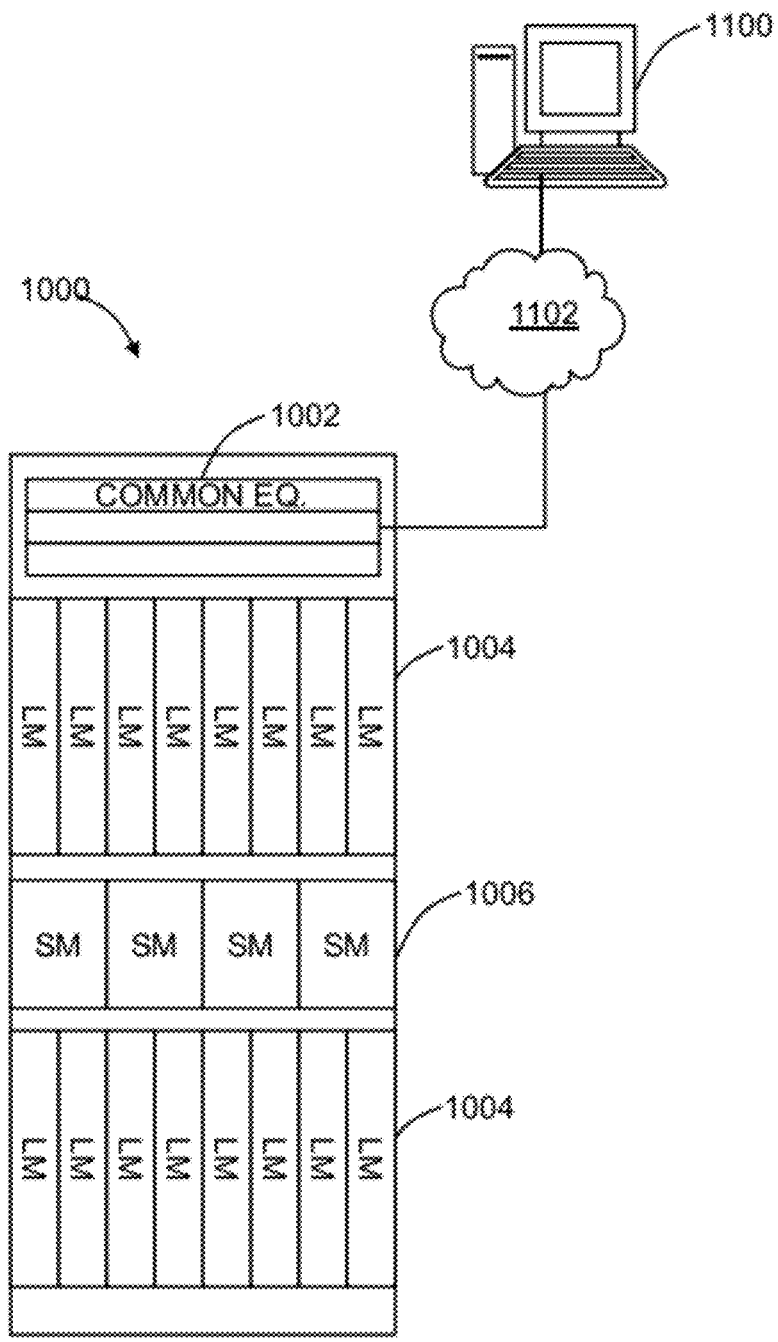
FIG. 9 illustrates a block diagram of an exemplary node in the multi-domain network.

Referring to FIG. 9, in an exemplary embodiment, a block diagram illustrates an exemplary node 1000 in the multi-domain network 100. The node 1000 may be network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the node 1000 includes common equipment 1002, line modules (LM) 1004, and switch modules (SM) 1006. The common equipment 1002 may include power, a control module, operations, administration, maintenance, and provisioning (OAM&P) access, and the like. For example, the common equipment 1002 may connect to a management system 1100 through a data communication network 1102. The management system 1100 may include a network management system (NMS), element management system (EMS), or the like. Note, the management system 110 may support "Click and Go" provisioning of services utilizing the systems and methods described herein to automatically determine paths across the domains 102, 104, 106. Additionally, the common equipment 1002 may include a control plane processor configured to operate a control plane using the systems and methods described herein.

The line modules 1004 may be communicatively coupled to the switch modules 1006, such as through a backplane, mid-plane, or the like. The line modules 1004 are configured to provide ingress and egress to the switch modules 1006, and are configured to provide interfaces for the services described herein. In an exemplary embodiment, the line modules 1004 may form ingress and egress switches with the switch modules as center stage switches for a three-stage switch, e.g. three stage Clos switch. The line modules 1004 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTU3, ODU4etc. Further, the line modules 1004 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 1004 may include DWDM interfaces, short reach interfaces, and the like, and may connect to other line modules 1004 on remote nodes 1000, NEs, end clients, and the like. From a logical perspective, the line modules 1004 provide ingress and egress ports to the node 1000, and each line module 1004 may include one or more physical ports.

The switch modules 1006 are configured to switch services between the line modules 1004. For example, the switch modules 1006 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; and the like. Specifically, the switch modules 1006 may include both Time Division Multiplexed (TDM) and packet switching engines. The switch modules 1006 may include redundancy as well, such as 1:1, 1:N, etc. Collectively, the line modules 1004 and the switch modules 1006 may provide connections across the domains 102, 104, 106. Those of ordinary skill in the art will recognize the present invention contemplates use with any type of node, network element, etc. with the node 1000 illustrated as one exemplary embodiment.

Figure 10:
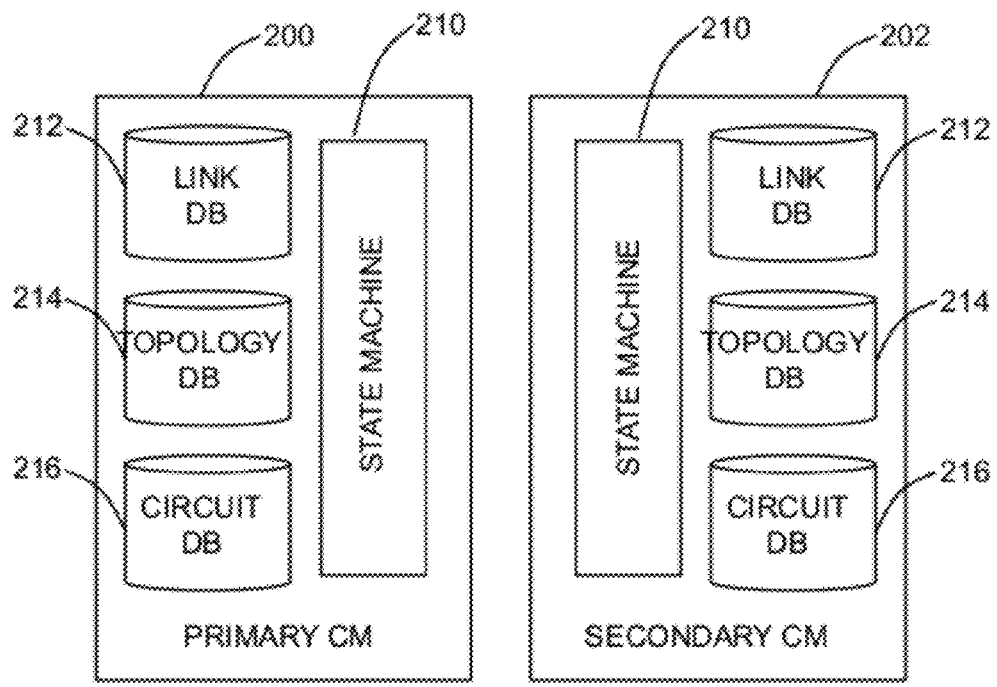
FIG. 10 illustrates redundant control modules (CMs) for an exemplary node in the multi-domain network to provide control plane processing.

Referring to FIG. 10, in an exemplary embodiment, redundant control modules (CMs) 2000, 2020 for the exemplary node 1000 are illustrated to provide control plane processing. For example, the control plane can include Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and the like. The CMs 2000, 2002 may be part of common equipment, such as common equipment 1002 in the optical switch of FIG. 9. The CMs 2000, 2020 may include a processor which is hardware device for executing software instructions and associated memory. The processor may be any custom made or commercially available processor, a central processing unit (CPU), an auxiliary processor among several processors associated with the CMs 2000, 2020, a semiconductor-based microprocessor (in the form of a microchip or chip set), or generally any device for executing software instructions. When the CM 2000, 2020 is in operation, the processor is configured to execute software stored within memory, to communicate data to and from the memory, and to generally control operations of the CM 2000, 2020 pursuant to the software instructions. In an exemplary embodiment, the CMs 2000, 2020 may operate as a PCE in a network, such as the PCEs 300 in the multi-domain network 100.

The CMs 2000, 2020 may also include network interfaces, a data store, memory, and the like. The network interfaces may be used to enable the CMs 2000, 2020 to communicate on a network, such as to communicate control plane information to other CMs. The network interfaces may include, for example, an Ethernet card (e.g., 10 BaseT, Fast Ethernet, Gigabit Ethernet) or a wireless local area network (WLAN) card (e.g., 802.11a/b/g). The network interfaces may include address, control, and/or data connections to enable appropriate communications on the network. The data store may be used to store data, such as control plane information received from NEs, other CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

Each of the CMs 2000, 2020 include a state machine 2100, a link database (DB) 2120, a topology DB 2140, and a circuit DB 2160. The CMs 2000, 2020 are responsible for all control plane processing. For example, the control plane may include OSRP, ASON, G-MPLS, or the like. In describing the exemplary embodiments herein, reference may be made to OSRP paths, links, legs, and lines. OSRP is a distributed protocol designed for controlling a network of optical switches, cross-connects (OXCs), or the like. OSRP introduces intelligence in the control plane of an optical transport system. It may perform many functions such as automatic resource discovery, distributing network resource information, establishing and restoring connections dynamically across the network, and the like. However, the present invention is not limited to OSRP. Those skilled in the art will recognize that other intelligent signaling and routing protocols that can (or can be modified to) provide similar functionality as OSRP (e.g., automatically establishing and restoring connections across the network, and the like) are within the scope of embodiments of the invention.

The CMs 2000, 2020 may be configured in a redundant 1+1, 1:1, etc. configuration. The state machine 2100 is configured to implement the behaviors described herein with regard to OTN mesh networking The DBs 2120, 2140, 2160 may be stored in the memory and/or data store. The link DB 2120 includes updated information related to each link in a network. The topology DB 2140 includes updated information related to the network topology, and the circuit DB 2160 includes a listing of terminating circuits and transiting circuits at an NE where the CMs 2000, 2020 are located. The CMs 2000, 2020 may utilize control plane mechanisms to maintain the DBs 2120, 2140, 2160. For example, a HELLO protocol can be used to discover and verify neighboring ports, nodes, protection bundles, and the like. Also, the DBs 2120, 2140, 2160may share topology state messages to exchange information to maintain identical data. Collectively, the state machine 2100 and the DBs 2120, 2140, 2160 may be utilized to advertise topology information, capacity availability, create and manage trail termination points, and provide connection management (provisioning and restoration). For example, each link in a network may have various attributes associated with it such as, for example, line protection, available capacity, total capacity, administrative weight, protection bundle identification, delay, and the like. The state machine 2100 and the DBs 2120, 2140, 2160 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints. As is described herein, the CMs 2000, 2020 may provide a routing subsystem through the state machine 2100 and the DBs 2120, 2140, 2160.

Further, the CMs 2000, 2020 are configured to communicate to other CMs 2000, 2020 in other nodes on the network. This communication may be either in-band or out-of-band. For SONET networks, the CMs 2000, 2020 may use standard or extended SONET line overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A path computation method across a multi-domain network, comprising:
   requesting a path setup from a node A in a domain A to a node Z in a domain Z;
   receiving an Explicit Route Object comprising a path from the node A to the node Z, wherein the Explicit Route Object comprises an unparsed domain-specific path segment for domain Z or any intermediate domains between the domain A and the domain Z, and wherein the unparsed domain-specific path segment is not understood by the domain A; and
   using the Explicit Route Object to set up a path from the node A to the node Z.

2. The path computation method of claim 1, wherein the unparsed domain-specific path segment is treated as a single, non-parsed object in the domain A.

3. The path computation method of claim 1, wherein the unparsed domain-specific path segment is utilized because the domain A uses a different addressing scheme and is not configured to parse the unparsed domain-specific path.

4. The path computation method of claim 1, wherein the requesting and receiving steps are performed by a Path Computation Element (PCE) in the domain A.

5. The path computation method of claim 4, wherein the unparsed domain-specific path segment is determined by a Path Computation Element (PCE) in the domain Z or any intermediate domains.

6. The path computation method of claim 5, wherein a PCE in the domain Z or any intermediate domains is configured to parse the unparsed domain-specific path segment during path setup.

7. The path computation method of claim 5, further comprising:
   with each PCE in each domain, temporarily reserving resources on a computed path segment in the Explicit Route Object;
   using the reserved resources in path setup; and
   if no setup message received for a predetermined time, releasing the temporarily reserved resources.

8. A multi-domain network, comprising:
   two or more domains;
   a plurality of nodes in each of the two or more domains;
   a first addressing scheme for the plurality of nodes in a first domain of the two or more domains;
   a second addressing scheme for the plurality of nodes in a second domain of the two or more domains;
   wherein a first node in the first domain is configured to receive an Explicit Route Object comprising a path from the first node to a second node in the second domain, wherein the Explicit Route Object comprises an unparsed domain-specific path segment for the second domain.

9. The multi-domain network of claim 8, wherein the unparsed domain-specific path segment is treated as a single, non-parsed object in the first domain.

10. The multi-domain network of claim 8, further comprising:
    a first Path Computation Element (PCE) in the first domain; and
    a second PCE in the second domain.

11. The multi-domain network of claim 10, wherein the unparsed domain-specific path segment is determined by the second PCE.

12. The multi-domain network of claim 11, wherein the second PCE or node in the second domain is configured to parse the unparsed domain-specific path segment during path setup.

13. The multi-domain network of claim 11, wherein the second PCE is configured to:
- temporarily reserve resources on a computed path segment in the second domain in the Explicit Route Object;
- use the reserved resources in path setup; and
- if no setup message received for a predetermined time, release the temporarily reserved resources.

14. A Path Computation Element (PCE), comprising:
- an interface communicatively coupling the PCE to a plurality of nodes forming a first domain;
- algorithms for path computation and setup;
- a processor communicatively coupled to the interface and configured to execute the algorithms for path computation and setup; and
- an algorithm to set up a path over heterogeneous domains outside the first domain;
- wherein the algorithm to set up a path over heterogeneous domains outside the first domain comprises:
  - requesting a path setup from a first node in the first domain to a second node in an external domain;
  - receiving an Explicit Route Object comprising a path from the first node to the second node, wherein the Explicit Route Object comprises an unparsed domain-specific path segment for the external domain or any intermediate domains between the first domain and the external domain, and wherein the unparsed domain-specific path segment is not understood by the PCE; and
  - using the Explicit Route Object to set up a path from the first node to the second node.

15. The PCE of claim 14, wherein the unparsed domain-specific path segment is treated as a single, non-parsed object in the first domain by the PCE.

16. The PCE of claim 14, wherein the unparsed domain-specific path segment is determined by a second PCE in the external domain or any intermediate domains.

17. The PCE of claim 16, wherein the second PCE or node in the second domain is configured to parse the unparsed domain-specific path segment during path setup.

18. The PCE of claim 16, wherein the second PCE is configured to:
- temporarily reserve resources on a computed path segment in the Explicit Route Object;
- use the reserved resources in path setup; and
- if no setup message received for a predetermined time, release the temporarily reserved resources.

* * * * *